United States Patent
Hobden et al.

(10) Patent No.: US 7,797,844 B2
(45) Date of Patent: Sep. 21, 2010

(54) LIGHT LINE GENERATING ASSEMBLY

(75) Inventors: Robert J. B. Hobden, Ontario (CA);
Oleksiy P. Sergyeyenko, Ontario (CA)

(73) Assignee: Black & Decker, Newark, DE (US)

( * ) Notice: Subject to any disclaimer, the term of this patent is extended or adjusted under 35 U.S.C. 154(b) by 1153 days.

(21) Appl. No.: 11/441,451

(22) Filed: May 26, 2006

(65) Prior Publication Data
US 2007/0109808 A1    May 17, 2007

Related U.S. Application Data

(60) Provisional application No. 60/736,825, filed on Nov. 15, 2005.

(51) Int. Cl.
*G01C 15/00* (2006.01)
(52) U.S. Cl. .................... 33/286; 33/227; 33/228
(58) Field of Classification Search .......... 327/60, 327/536, 537, 59; 363/59, 60
See application file for complete search history.

(56) References Cited

U.S. PATENT DOCUMENTS

| | | | |
|---|---|---|---|
| 4,031,629 A | 6/1977 | Paluck | |
| 4,836,669 A | 6/1989 | Teach | |
| 5,218,770 A | 6/1993 | Toga | |
| 5,539,990 A | 7/1996 | Le | |
| 5,584,458 A | 12/1996 | Rando | |
| 5,790,248 A | 8/1998 | Ammann | |
| 5,864,956 A | 2/1999 | Dong | |
| 6,449,855 B1 | 9/2002 | Louis | |
| 6,449,858 B1 * | 9/2002 | Reay et al. ............ | 33/366.12 |
| 6,453,568 B1 | 9/2002 | Hymer | |
| 6,457,246 B1 | 10/2002 | Frazer et al. | |
| 6,542,304 B2 * | 4/2003 | Tacklind et al. ............ | 359/618 |
| 6,577,388 B2 | 6/2003 | Kallabis | |
| 6,588,115 B1 | 7/2003 | Dong | |
| 6,694,629 B2 * | 2/2004 | Goodrich ............ | 33/286 |
| 6,718,643 B2 | 4/2004 | Tamamura | |
| 6,735,879 B2 | 5/2004 | Malard et al. | |
| 6,914,930 B2 | 7/2005 | Raskin et al. | |
| 6,935,034 B2 * | 8/2005 | Malard et al. ............ | 33/286 |
| 7,174,648 B2 * | 2/2007 | Long et al. ............ | 33/286 |

(Continued)

FOREIGN PATENT DOCUMENTS

GB    2416843 A    8/2006

(Continued)

*Primary Examiner*—Anabel M Ton
(74) *Attorney, Agent, or Firm*—Edell, Shapiro & Finnan, LLC

(57) ABSTRACT

A light line generating assembly is disclosed. The assembly includes a light generating unit and a base. The light generating unit produces intersecting light planes to form light lines on a surface. The light generating unit may further include level indicators for manual leveling of the light generating unit. The base is operable to repositionably receive the light generating unit such that the unit may be rotated with respect to the base. The base includes an attachment mechanism operable to connect the base to a supporting surface such as a wall or floor. The attachment mechanism is adjustable, and can be reoriented to permit the selective use of particular coupling devices/methods. Additionally, the light line generating assembly may include an adjustable measuring device (e.g., a protractor) moveably attached to the base.

24 Claims, 9 Drawing Sheets

U.S. PATENT DOCUMENTS

| | | |
|---|---|---|
| 7,181,854 B2 * | 2/2007 | Long et al. .................... 33/286 |
| 7,269,907 B2 * | 9/2007 | Levine et al. ................. 33/286 |
| 7,310,887 B2 * | 12/2007 | Nash et al. .................... 33/286 |
| 7,412,774 B2 * | 8/2008 | Lu et al. ....................... 33/290 |
| 2001/0049879 A1 | 12/2001 | Moore, Jr. |
| 2002/0066191 A1 | 6/2002 | Hsu |
| 2003/0231303 A1 | 12/2003 | Raskin et al. |
| 2004/0016058 A1 * | 1/2004 | Gardiner et al. ................ 7/119 |
| 2004/0083614 A1 | 5/2004 | Raskin et al. |
| 2004/0103546 A1 | 6/2004 | Marshall et al. |
| 2004/0123472 A1 | 7/2004 | Wu |
| 2004/0187327 A1 | 9/2004 | Levine |
| 2004/0205972 A2 | 10/2004 | Wu |
| 2005/0022399 A1 | 2/2005 | Wheeler et al. |
| 2005/0278966 A1 | 12/2005 | Liu |
| 2006/0013278 A1 | 1/2006 | Raskin et al. |
| 2006/0017427 A1 | 1/2006 | Nash et al. |
| 2007/0056173 A1 * | 3/2007 | Burry et al. ................... 33/286 |

FOREIGN PATENT DOCUMENTS

WO      2005079480 A      9/2005

* cited by examiner

US 7,797,844 B2

LIGHT LINE GENERATING ASSEMBLY

CROSS REFERENCE TO RELATED APPLICATIONS

This application claims priority to U.S. Provisional Patent Application No. 60/736,825 filed Nov. 15, 2005 and entitled "Self-Leveling, Intersecting Laser and Protractor", the disclosure of which is hereby incorporated by reference in its entirety.

FIELD OF THE INVENTION

The present invention relates to a light line generating assembly and, in particular, to a laser level device including a line generating unit and a base adapted to mount the line generating unit on a supporting surface such as a wall or floor.

BACKGROUND OF THE INVENTION

Alignment of surfaces is a common problem in a variety of fields, ranging from construction to interior decorating. Proper spatial alignment is necessary to ensure that walls are perpendicular to a floor, or otherwise plumb. Laser level devices are often used in construction to produce a plane of light that serves as a reference for various projects. Laser level devices save considerable time and effort during the initial layout of a construction project as compared to other tools such as beam levels, chalk lines, or torpedo levels. Some examples of projects where laser level devices are useful include laying tile, hanging drywall, mounting cabinets, installing counter tops, and building outdoor decks.

SUMMARY

A light line generating assembly in accordance with the present invention is disclosed herein. The light line generating assembly of the present invention may include a light generating unit operable to generate intersecting light planes and a base mountable a supporting surface such as a wall or floor. The light generating unit of the present invention may be coupled to the base such that the light generating unit rotates with respect to the base. The light generating unit of the present invention may further include at least one level indicator such as a bubble vial. The base may further include an attachment mechanism capable of a plurality of attachment modes. For example the attachment mechanism may comprise a rotating disk that can be selectively reoriented from a first attachment position to a second attachment position. Additionally, the base may further include an adjustable measuring device. For example, the measuring device may include a protractor that can be selectively rotated with respect to the base.

BRIEF DESCRIPTION OF THE DRAWINGS

FIG. 5A illustrates a partial cross-sectional side view of a laser plane generating assembly, FIG. 5B is a cross-sectional view of along line IV-IV of FIG. 5A; and FIG. 5C illustrates a partial cross-sectional view of the laser plane generating assembly of FIG. 5A generating a laser plane on a work surface.

Like reference numerals have been used to identify like elements throughout this disclosure.

DETAILED DESCRIPTION OF THE INVENTION

Figure 1:
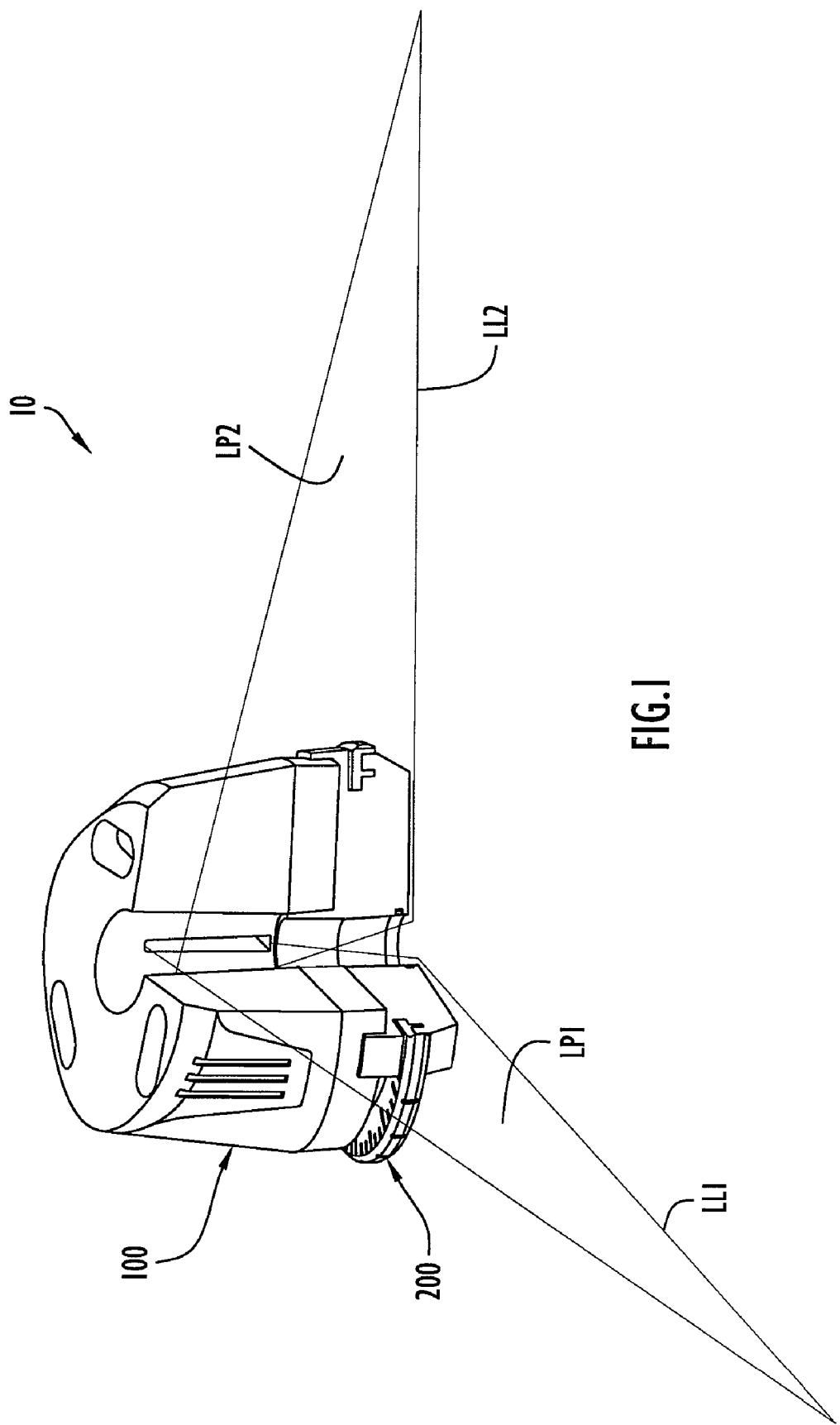
FIG. 1 illustrates a perspective view of a light line generating assembly according to an embodiment of the present invention.
Figure 2:
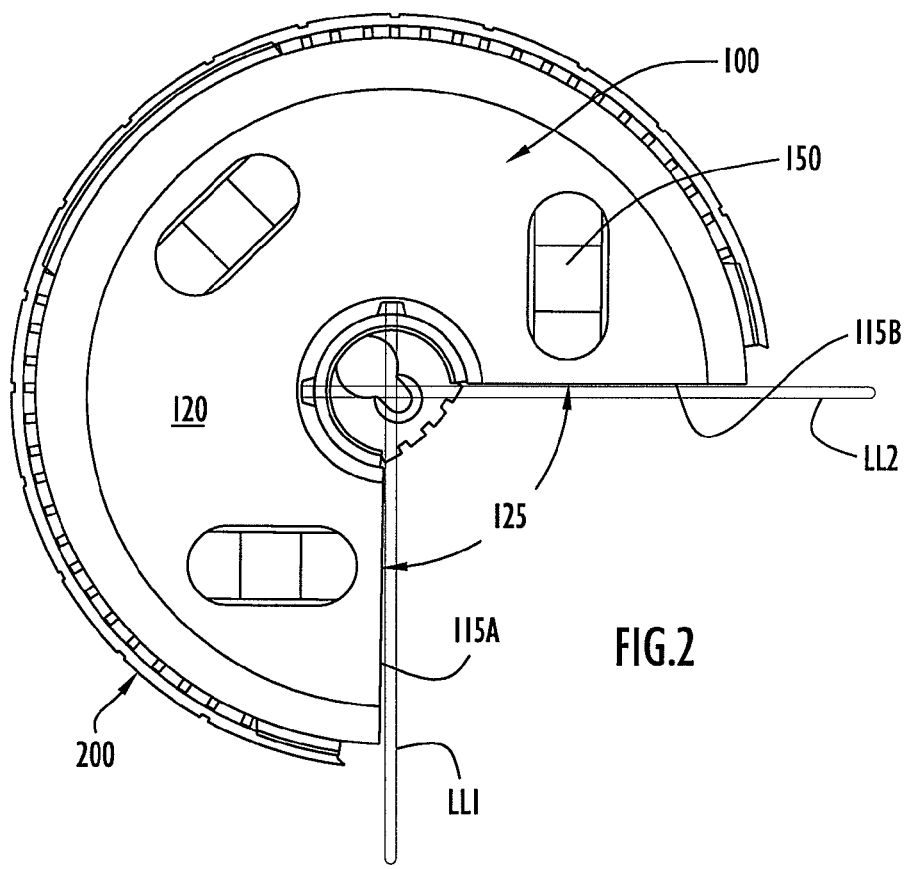
FIG. 2 illustrates a top view of the light line generating assembly of FIG. 1.

FIGS. 1 and 2 illustrate perspective and top views, respectively, of a surface mountable light line generating assembly according to an embodiment of the present invention. Referring to FIG. 1, the assembly 10 may include a line, plane, or light generating unit 100 and a surface mountable base 200. The light generating unit 100 may include a structure operable to generate multiple light planes LP1, LP2, which, in turn, generate light lines LL1, LL2, respectively, on a work surface or workpiece (discussed in greater detail below).

Figure 3:
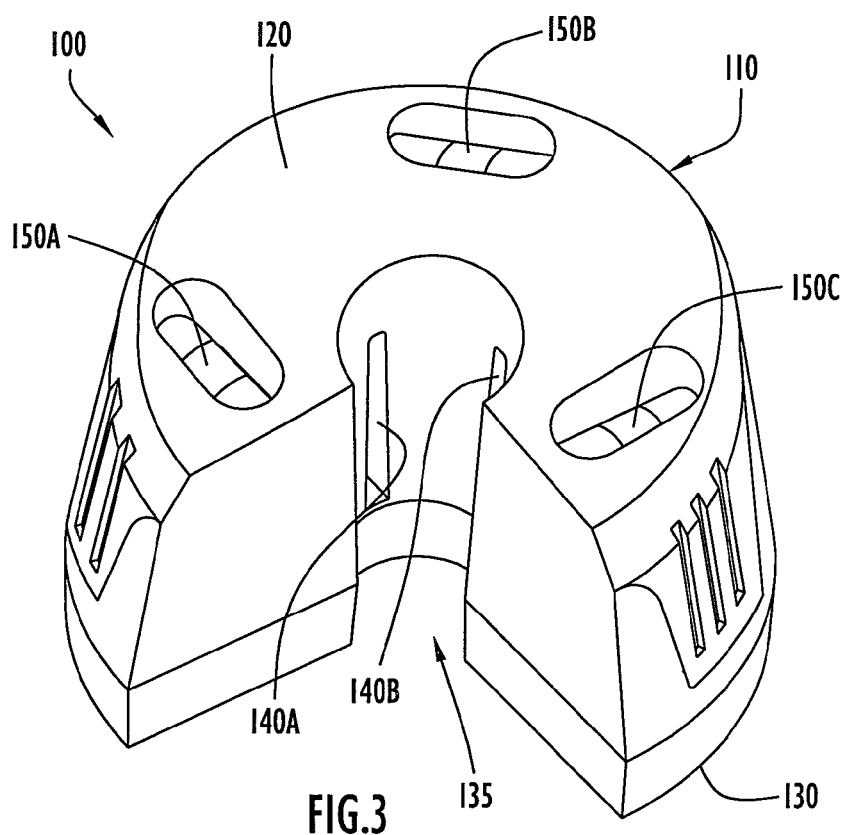
FIG. 3 illustrates an isolated front perspective view of the light generating unit of the light line generating assembly shown in FIG. 1.

FIG. 3 illustrates an isolated, front, perspective view of a light generating unit 100 according to an embodiment of the present invention. As shown, the light generating unit 100 may include a housing or shell 110 having a top surface 120 and a bottom surface 130. In one embodiment, the housing 110 of the light generating unit 100 may have a generally curved, C-shaped configuration with spaced apart ends 115A, 115B that define an opening 125. The angular dimension of the opening 125 may include, but is not limited to, approximately 90°. A central aperture 135 may extend axially through the housing 110. With this configuration, the light planes LP1, LP2 may be transmitted from the housing 110 such that they intersect along the central axis of the aperture 135 and pass through the opening 125 to provide reference lines (LL1, LL2) that permit a user to orient objects on a supporting or work surface such as a wall or floor. The housing 110 of line generating unit 100, however, is not limited to the embodiment shown, and may comprise shapes other than the generally C-shaped structure.

The housing 110 of the light generating unit 100 may further include one or more windows 140 operable to permit the transmission of a light plane LP1, LP2 our from the housing 110. The number and dimensions of the window 140 are not particularly limited to that which is illustrated herein.

When a plurality of windows 140 are present, the windows may be angularly spaced about the central aperture 135 at any angle suitable for their described purpose. By way of specific example, as shown in FIG. 3, the housing 110 may include a first window 140A spaced from a second window 140B at an angle including, but not limited to, approximately 90°.

The housing 110 of the light generating unit 100 may further include one or more level indicators 150 to aid in the selective, manual leveling of the light generating unit 100 in a desired plane. The level indicators 150 may include, but are not limited to, spirit levels or bubble vials. In the embodiment illustrated in FIG. 3, three level indicators 150A, 150B, 150C may be angularly spaced about the top surface 120 of the housing 110. Specifically, the level indicator 150A may be generally positioned approximately 90° from the second level indicator 150B, which, in turn, may be generally positioned approximately 90° from the third level indicator 150C such that first 150A and third 150C level indicators are generally opposite each other and positioned proximate the ends 115A, 115B of the housing 110 (i.e., proximate the ends of the "C"). In addition, the first 150A and/or third level indicators 150C may be oriented such that they are offset from the relative orientation of the second level indicator 150B. By way of example, each of the first 150A and third 150C level indicators may be oriented at and angle offset approximately 45° with respect to the orientation of the second level indicator 150B. The second level indicator 150B, moreover, may be oriented at an oblique angle with respect to one or both laser lines LL1, LL2. It is important to note that the number and/or positioning of level indicators 150A-C is not particularly limited to that shown herein.

Figure 4:
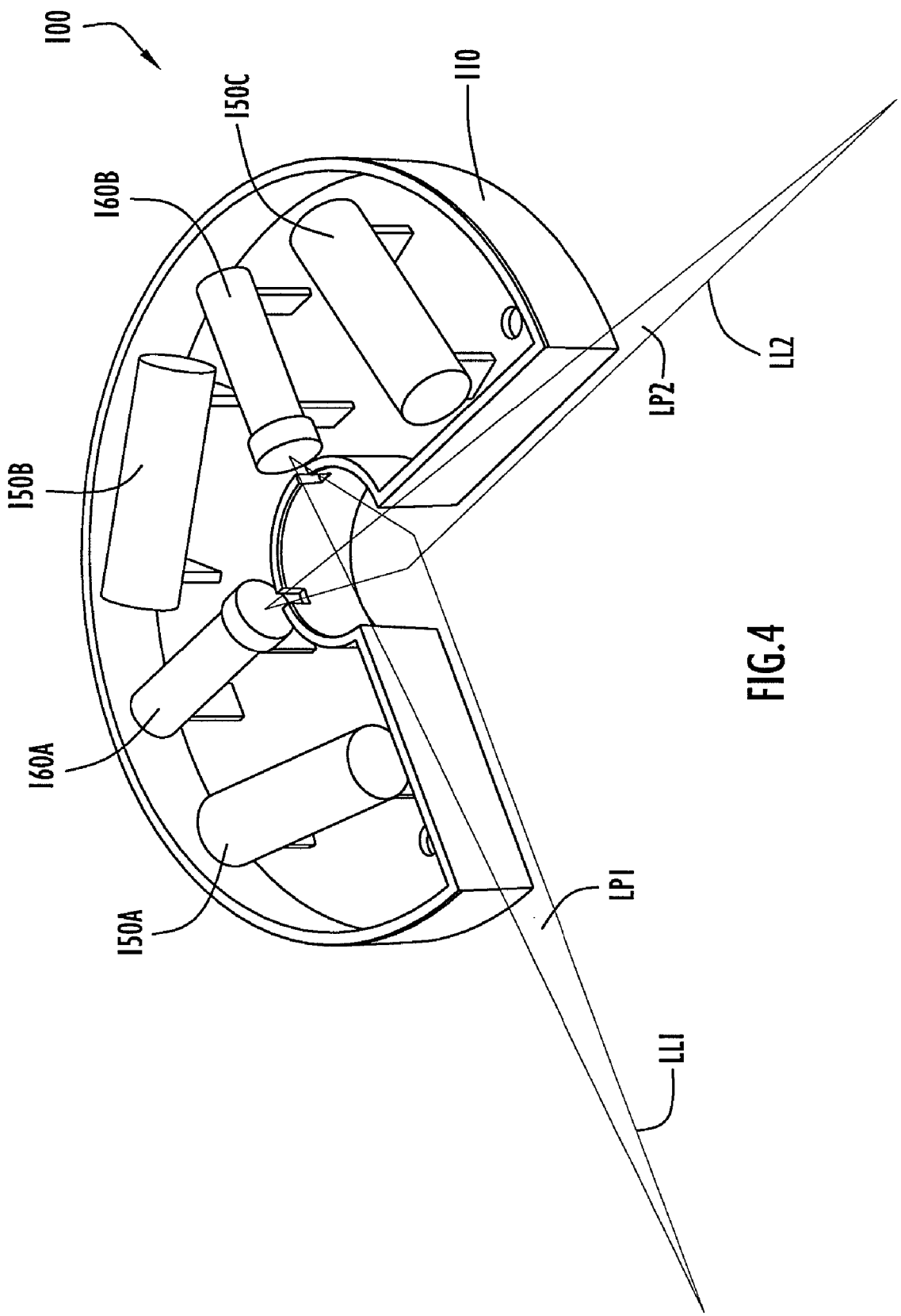
FIG. 4 illustrates a perspective view of the light generating unit of FIG. 3, with a portion of the housing removed to show the light plane generating assemblies.
Figure 5A:
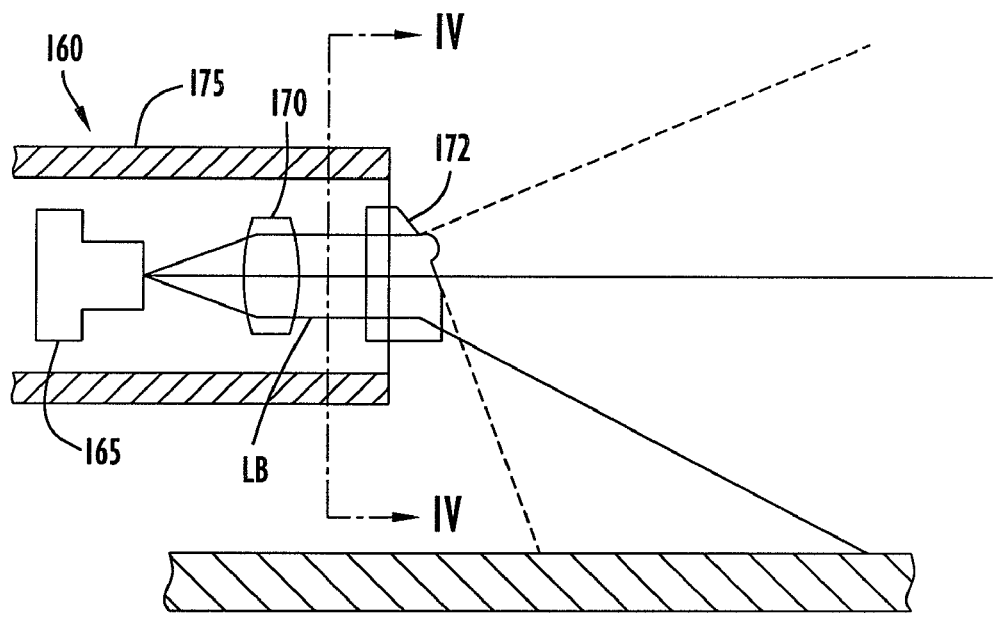
FIGS. 5A-5C illustrate a light line generating device in accordance with the present invention, where
Figure 5B:
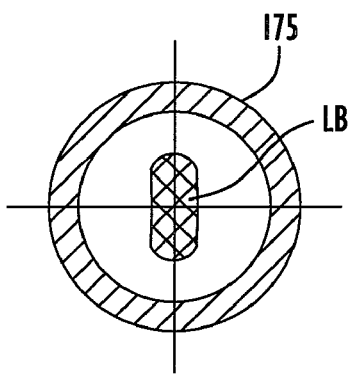
Figure 5C:
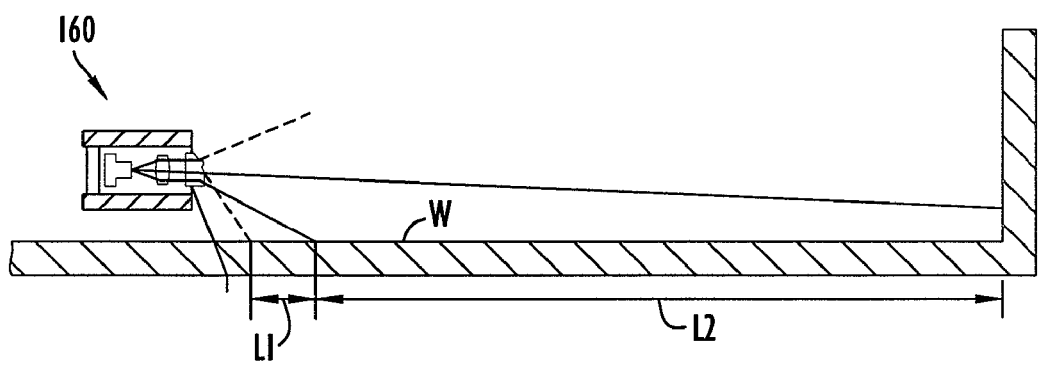

FIG. 4 illustrates an interior view of the light generating unit 100 (with a portion of the housing 110 removed for clarity). As shown, the housing 110, in addition to containing the level indicators 150A, 150B, 150C, contains one or more light generating devices operable to generate a light plane and/or light line. The light generating device may include, but is not limited to, a laser assembly. FIGS. 5A-5C illustrate an exemplary laser assembly 160 in accordance with an embodiment of the invention. Referring to FIG. 5A, the laser assembly 160 may include a laser diode 165, a collimating lens 170, and a line lens 172. The collimating lens 170 is operable to form the laser beam LB exiting the laser diode 165 into a beam having a generally oval cross-section (FIG. 5B). The line lens 172 then converts the laser beam LB into a planar beam (i.e., a laser plane). The line lens 172 may possess various shapes to accomplish this purpose (e.g., a substantially circular cross-section, a generally half-circle cross-section, a generally quarter-circle cross-section, and/or a compound cross-section, which includes a rectangle connected to a quarter-circle). By way of specific example, the line lens 172 may be a prismatic lens that includes at least two cylindrical lens forms with significantly different focal distances to generate at least two superimposed laser planes with different divergence angles and trajectories. Each of the laser diode 165, collimating lens 170, and the line lens 172 may be housed in a laser assembly housing or barrel 175. The barrel 175 may be substantially cylindrical and/or adjustable (to permit a user to reposition the barrel within the housing 110 of the light generating unit 100). The barrel 175 is typically disposed within the housing 110 such that laser plane is directed through its associated window 140A, 140B.

The operation of the laser assembly 160 is explained with reference to FIG. 5C. When the light generating unit 100 is disposed against a supporting or work surface W, the laser assembly 160 emits a laser plane that contacts the work surface W, forming a laser line thereon. As noted above, to the differing focal distances, the laser assembly 160 may project two or more laser lines, with one line L1 directed to strike the work surface W at a short distance and another line L2 directed to strike the work surface W at a longer distance, so that the two laser light planes are used to generate a single light line (L1+L2). These and further details of the laser assembly 160 according to an embodiment of the present invention are disclosed in U.S. Pat. No. 6,914,930 to Raskin et al., the contents of which are hereby incorporated by reference in their entirety.

The number and positioning of the laser assemblies 160 is not particularly limited to that which is shown herein. In the embodiment of FIG. 4, the light generating unit 100 includes a first laser assembly 160A and a second laser assembly 160B operable to create intersecting laser planes LP1, LP2 (also see FIG. 1). The first laser assembly 160A, for example, may be angularly spaced 90° from a second laser assembly 160B, with the laser assemblies 160A, 160B creating a first laser plane LP1 and a second laser plane LP2. In the illustrated example laser plane LP1 intersects laser plane LP2 at an angle of approximately 90°. As described above, the point of intersection may include the axis of the central aperture 135. Other angular intersections of laser planes may further be provided without departing from the scope of the present invention. The light generating unit 100 may also include a power source, such as a battery, for powering the laser assemblies (not shown). The power source may be disposed within housing 110 of the light generating unit 100 or inside a laser assembly 160A, 160B. The light generating unit 100 may also include a switch disposed on the housing 110 to control power to the laser assemblies 160A, 160B of the light generating unit 100.

Figure 6:
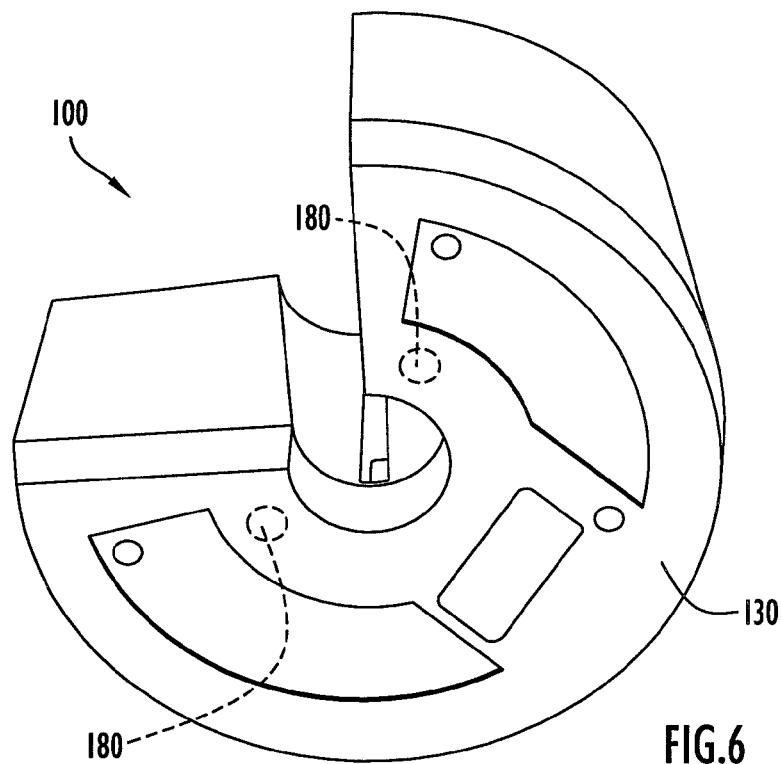
FIG. 6 illustrates a bottom perspective view of the light generating unit of FIG. 3, showing magnetic connection points.

FIG. 6 illustrates a bottom perspective view of the light generating unit 100 in accordance with the present invention. The bottom surface 130 of the housing 110 of the light generating unit 100 may include one or more fasteners 180 to couple the light generating unit 100 to the surface mountable base 200. The fasteners 180 may include, but are not limited to, magnets configured to engage a metal strip on the surface mountable base 200 (discussed in greater detail below).

Figure 7:
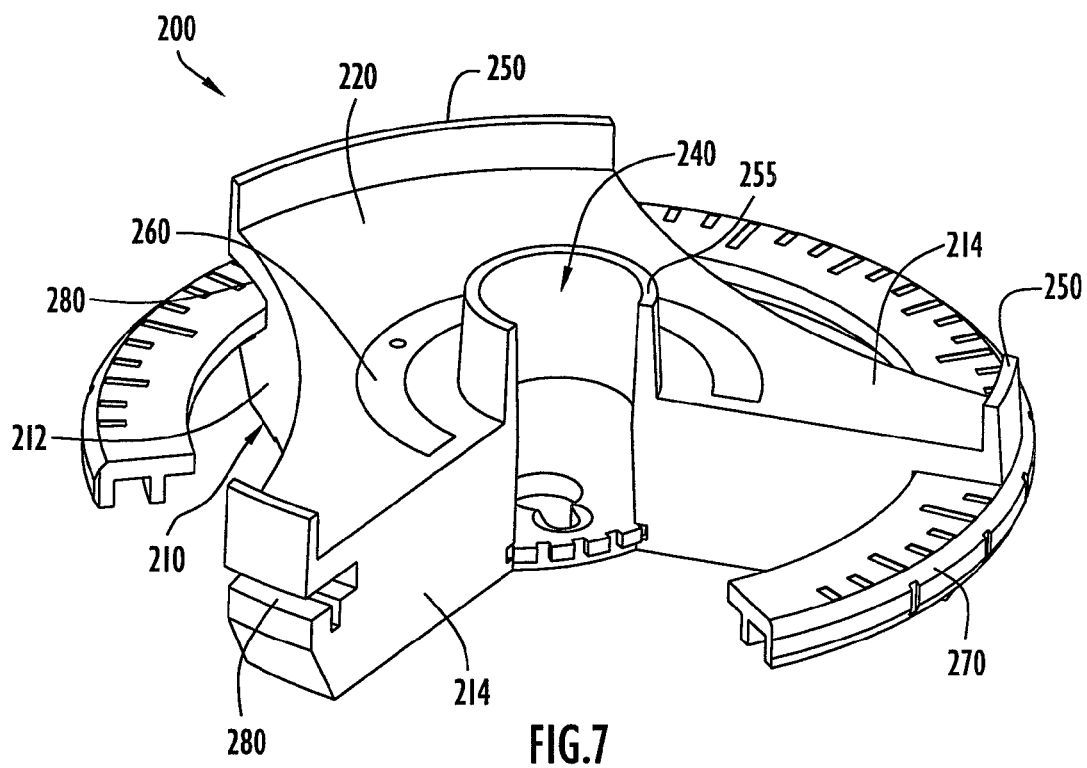
FIG. 7 illustrates an isolated front perspective view of a surface mountable base according to an embodiment of the present invention.

FIG. 7 illustrates an isolated front perspective view of a surface mountable base 200 according to an embodiment of the present invention. The surface mountable base 200 may include a structure operable to (1) support the light generating unit 100 and (2) be secured to a supporting surface such as a wall or floor. In the illustrated embodiment, the surface mountable base 200 includes a body 210 having a first or upper surface 220 and a second or bottom surface 230 (see FIG. 9). The body 210 may have any shape and/or dimensions suitable for its described purpose. By way of example, the body 210 may possess a generally Y-shaped configuration including a stem 212 and two angled leg portions 214. The leg portions may define an opening with dimensions substantially similar to the opening 125 of line generating unit. An open channel 240 may be formed in the general center of the body 210. The channel 240 may be positioned within the mountable base 200 such that it aligns with the central aperture 135 of the light generating unit 100 (i.e., the mountable base 200 and the light generating unit 100 may be coaxial). The mountable base 200, however, is not limited to the embodiment shown herein, and may comprise shapes other than the generally Y-shaped structure illustrated. The surface mountable base 200 of the present invention may further include an outer flange or lip 250 extending from the top surface 220 of the body 210 (i.e., the outermost edge of the stem 212 and leg portions 214), as well as an inner flange or lip 255 extending from the top surface 220 of the body along the central channel 240. The interior surfaces of the flanges 250, 255 may be contoured for engagement with the exterior surface of the housing 110 of the light generating unit 100 to provide sliding engagement between the light generating unit 100 and the surface mountable base 200. Specifically, the flanges 250, 255 permit the rotation of the light generating unit 100 along the surface mountable base 200, but prevent the lateral motion of the light generating unit 100 (with respect to the surface mountable base 200). With this configuration, the flanges 250, 255 define a track operable to retain the light generating unit 100 on the surface mountable base 200. Thus, the light generating unit 100 may be rotated about the surface mountable base 200. Once connected, the central channel 240 of the base 200 aligns with the central aperture 135 of the light generating unit 100. As explained above, the intersection point of the light planes LP1, LP2 may be in registration with the axis of the central aperture 135; consequently, the intersection point is further positioned to align with the axis of the central channel 240 (and thus of the light line generating assembly 10).

The surface mountable base 200 may further include a metal ring or strip 260 positioned on the top surface 220 of its body 210. The strip 260 may be configured to engage the fastener 180 (e.g., a magnet) located on the bottom surface 130 of the housing 110 of the light generating unit 100. In operation, the light generating unit 100 is placed onto the surface mountable base 200 such that the bottom surface 130 of the light generating unit 100 contacts the top surface 220 of the surface mountable base 200. The fastener 180 on the bottom surface 130 of the light generating unit 100 contacts the metal strip 260, removably securing the light generating unit 100 to the surface mountable base 200. Once connected, the light generating unit 100 may be selectively rotated about the surface mountable base 200 to any desired angular position including, but not limited to, 360° of rotation. Thus, the interaction between the fastener 180 and the metal strip 260 stabilizes the light generating unit 100, holding it in place, while still allowing its rotation with respect to the surface mountable base 200.

The surface mountable base 200 may further include a ruled member. The ruled member may completely span the body 210 of the mountable base 200 or may span a portion of the body 210. In the embodiment illustrated in FIGS. 7 and 8, the ruled member may be a protractor 270 (i.e., a semicircular ruled member utilized for angular measurement) extending transversely from the body 210 and spanning approximate 180° to 270° around the circumference of the surface mountable base 200. With this configuration, the opening of the protractor may be positioned away from the opening 125 of the light generating unit 100, permitting unencumbered access to the laser planes LP1, LP2 intersection point within the central aperture 135. It is important to note, however, that the protractor 270 may span any degree up to 360° degrees around the surface mountable base 200.

Figure 8A:
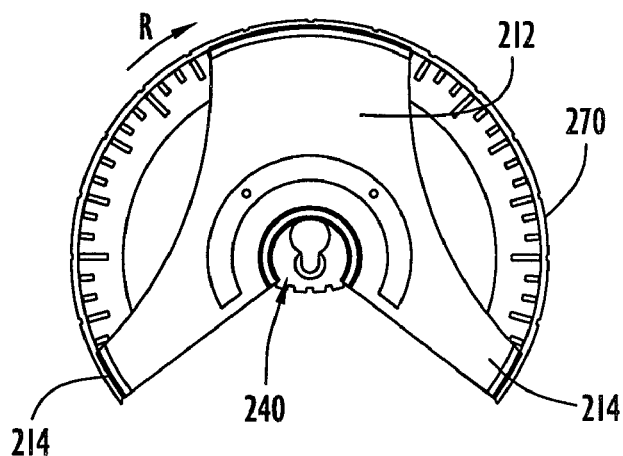
FIGS. 8A-8C illustrate top views of the surface mountable base of FIG. 7, illustrating the rotation of the guide/rule member.
Figure 8B:
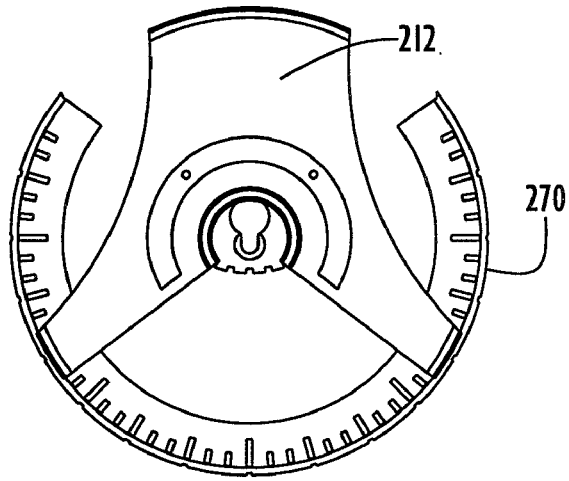
Figure 8C:
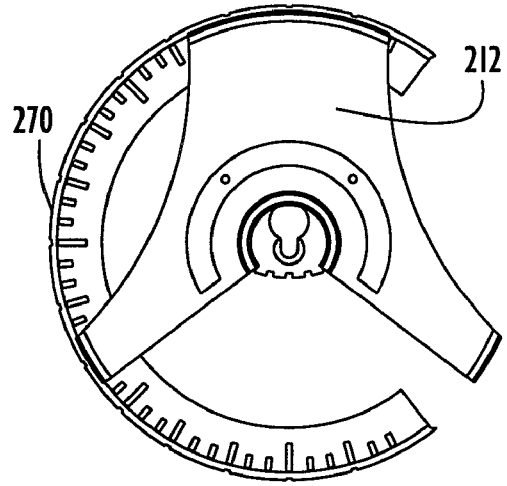

The protractor 270 may be adapted to rotate about the body 210 of the surface mountable base 200. As seen best in FIG. 7, the body 210 (i.e., the stem 212 and legs 214) may include a slot 280 cut inward from its perimeter and sized to slidingly receive the protractor 270. Thus, as illustrated in the embodiment of FIGS. 8A-8C, the protractor 270 may slide within the slot 280 (i.e., be rotated within the slot 280 along direction R) from a first protractor position (FIG. 8A) to a second protractor position (FIG. 8B) and further to a third protractor position (FIG. 8C). The degree of rotation of the protractor 270 with respect to the body 210 includes, but is not limited to, to 360° of rotation. With this configuration, the protractor 270 may be selectively oriented about the body 210 of the surface mountable base 200. For example, as shown in FIG. 8A, the protractor 270 may be positioned to permit unencumbered access to the central channel 240 of the surface mountable base 200 which, in turn, permits open access to the intersecting laser planes LP1, LP2. The protractor 270 may be utilized to measure angles with respect to the projected laser planes LP1, LP2 (and laser lines LL1, LL2) or it may be used to measure the reorientation of the projected laser planes LP1, LP2 and laser line LL1, LL2 with respect to a known position on the work surface W.

Figure 9:
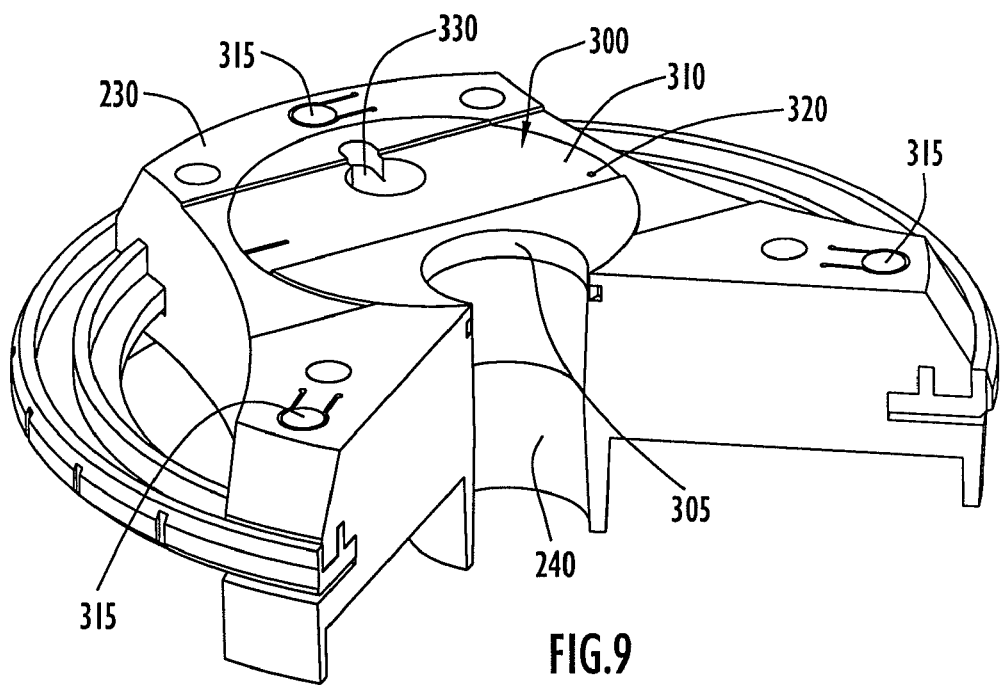
FIG. 9 illustrates a bottom front perspective view of the surface mountable base of FIG. 7, showing an attachment mechanism for securing the base to a supporting surface, in accordance with an embodiment of the present invention.
Figure 10:
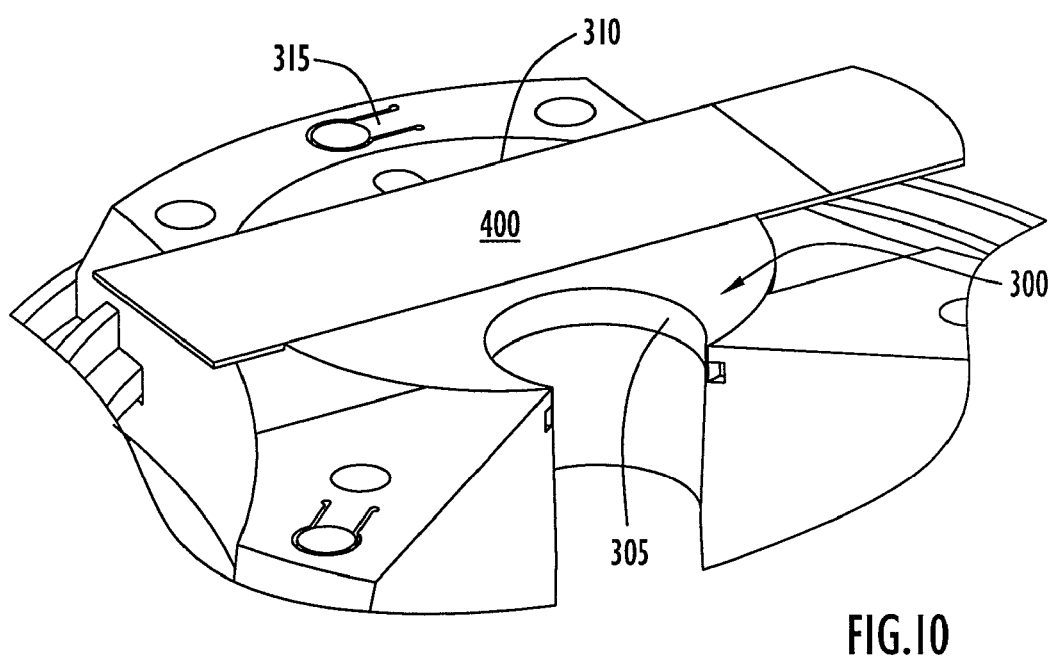
FIG. 10 illustrates a close-up bottom perspective view of the surface mountable base of FIG. 9, showing an adhesive strip attached to the bottom surface of the base.

The surface mountable base 200 may further include an attachment mechanism operable to secure the surface mountable base 200 to a work surface W such as a wall. FIG. 9 is a perspective view of the bottom surface 230 of the surface mountable base 200 in accordance with the present invention. FIG. 10 is a close-up view of the bottom surface 230 illustrated in FIG. 9. As shown, the attachment mechanism of the present invention may include a generally circular disk 300 disposed on the bottom surface 230 of the body 210, located proximate the center of surface mountable base 200. The disk 300 may include a cut-out section 305 contoured to correspond to the central channel 240 of the body 210. When aligned with the central channel 240 of the body 210, the cut-out section 305 provides unencumbered access to the channel (and thus the intersecting laser planes LP1, LP2).

The disk 300 may be adapted to provide multiple modes of attachment. For example, the disk may 300 include a channel or recess 310 operable to receive a strip of double sided adhesive strip 400. In addition, the bottom surface 230 of the body 210 may include a plurality of resilient feet 315 depressible from a normal, extended position to a compressed, inset position. In operation, a double-sided adhesive strip 400 is positioned within and applied to the recess 310. The surface mountable base 200 may then be positioned on a supporting surface (e.g., a work surface W such as a wall). The resilient feet 315 are configured to engage the supporting surface while maintaining a space between the double-sided adhesive strip 400 and the surface. This permits the sliding of the surface mountable base 200 along the work surface W. Once the surface mountable base 200 is at the desired location, it is pressed toward the work surface W, causing the feet 315 to compress and the double-sided adhesive strip 400 to contact—and adhere to—the work surface W. In this manner, the surface mountable base 200 is secured in place on the work surface W.

Figure 11:
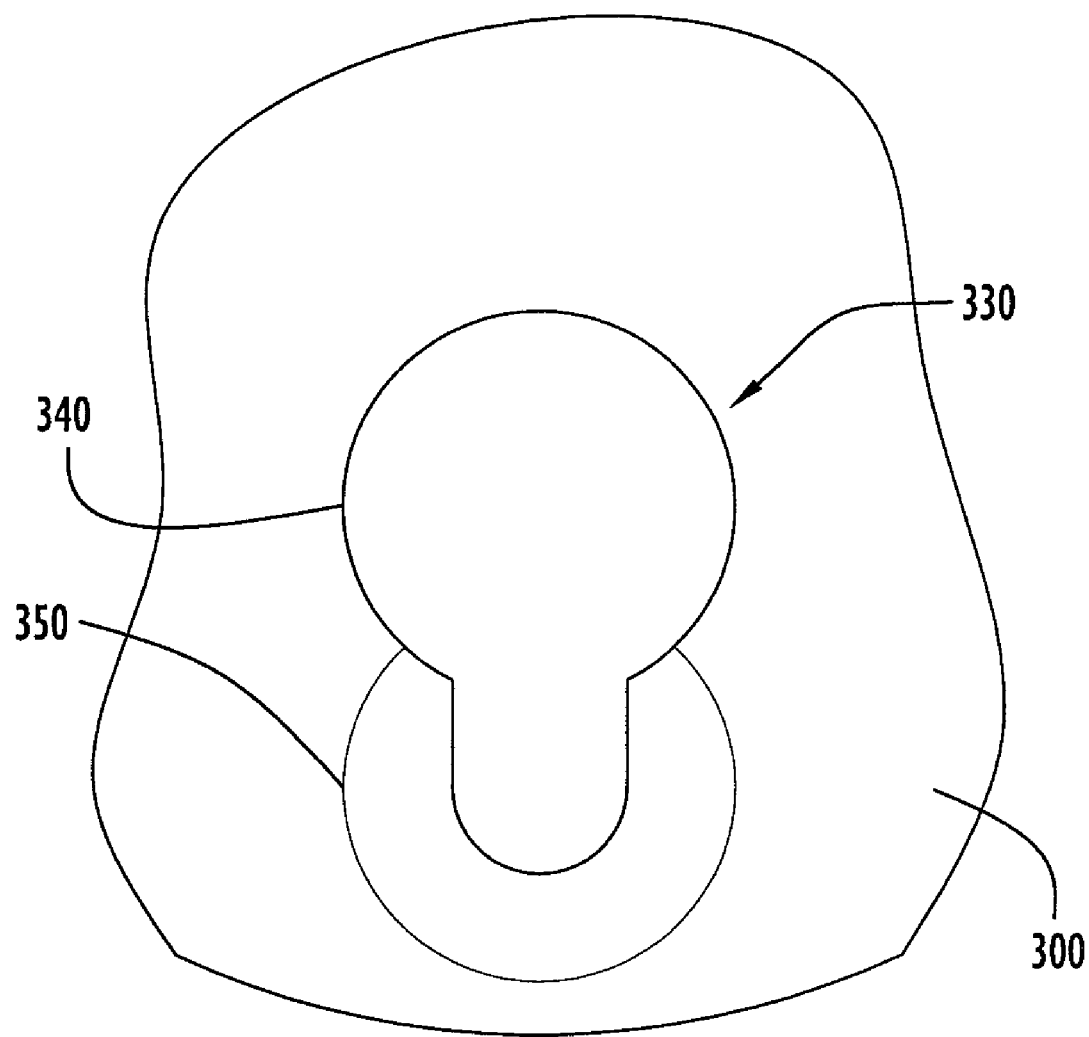
FIG. 11 illustrates an isolated top view of a fastener mount of the attachment mechanism of FIG. 9 according to an embodiment of the present invention.

The disk 300 may further include a hole 320 operable to receive a pointed fastener (e.g., a pushpin, nail, tack, etc.) which would extend through hole 320 to engage the work surface W and secure the surface mountable base 200 thereto. The disk 300 may further include a fastener mount 330 configured to receive a fastener such as a screw. FIG. 11 is an isolated top view of the fastener mount 330 of the disk 300 in accordance with an embodiment of the invention. The fastener mount 330 may include an aperture 340 adapted to receive a fastener and a conical recess 350 designed to receive the head and shank of the fastener. The outermost dimensions of the conical recess 350 may be substantially similar to those of the aperture 340. With this configuration, any type of screw head that fits through the aperture will "self center" on the conical recess 350 when it is tightened. In operation, once the surface mountable base 200 is placed in a desired position, a fastener is inserted into the aperture 340 and engages the work surface W. The screw head is positioned within the conical recess 350, supporting the surface mountable base 200 on the work surface W.

Figure 12A:
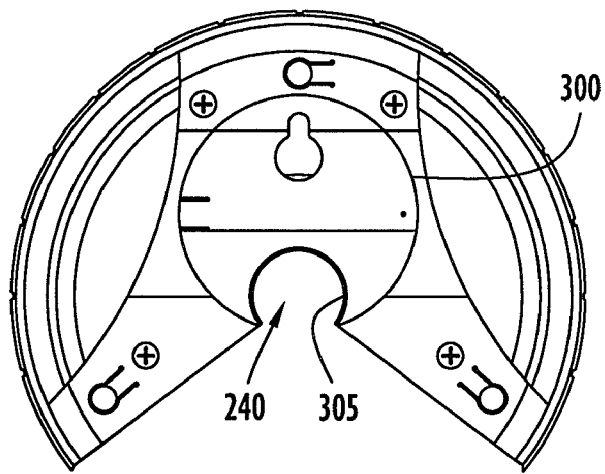
FIGS. 12A-12C illustrate the reorientation of the attachment mechanism of FIG. 9 from a first position to a second position, and further to a third position.
Figure 12B:
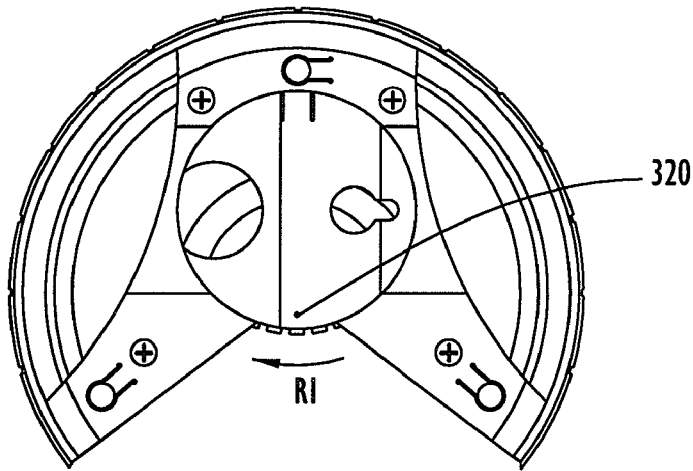
Figure 12C:
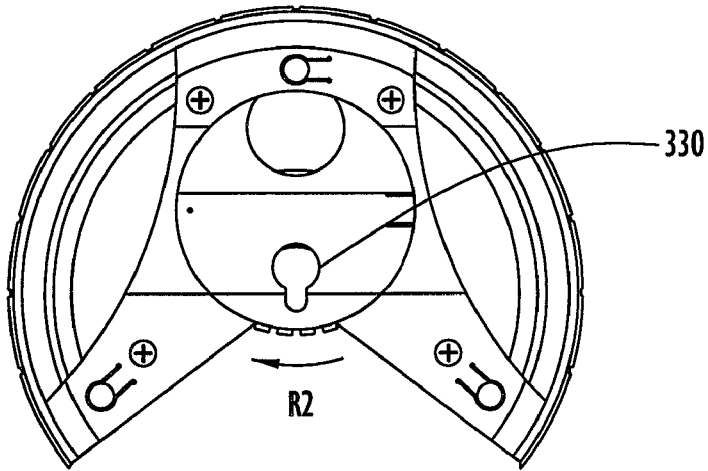

The attachment mechanism of the present invention may be reconfigurable. Specifically, the disk 300 may be rotated with respect to the body 210 of the surface mountable base 200 to selectively engage the desired attachment mechanism and alter the attachment mode of the base 200. FIGS. 12A-12C illustrate the repositioning of the disk 300 from a first attachment mechanism position to a second attachment mechanism position, and further to a third attachment mechanism position. In the first attachment mechanism position (FIG. 12A), the double-sided adhesive strip 400 may be used and the cut out section 305 is positioned so as to not interfere with the body channel 240. In this position, the cut-out section 305 is aligned with the central body channel 240 and the double-sided adhesive strip 400 is positioned within the recess 310 and is used to connect the surface mountable base 200 to the work surface W as described above.

The disk 300 may be rotated (indicated by arrow R1) from the first attachment mechanism position (FIG. 12A) to the second attachment mechanism position (FIG. 12B), wherein the hole 320 is placed in registration with the channel 240. In this position, a fastener such as pushpin, nail, tack, etc. may be inserted into the hole 320 to engage the work surface W. The disk 300 may be further rotated (indicated by arrow R2) from the second attachment mechanism position (FIG. 12B) to the third attachment mechanism position (FIG. 12C). In the third attachment mechanism position, the fastener mount 330 is positioned in registration with the central channel 240; consequently, a fastener may be axially inserted down the central channel 240 and through the aperture 340 as described above. At each position, the central channel 240 of the mountable base 200 may include frictional detents to secure the disk 300 in any one of the first, second, third, or intermediate rotational positions.

With the above described configuration, the light generating unit 100 of the present invention may rotate relative to the surface mountable base 200 and/or the supporting surface (e.g., a work surface W such as a wall or floor). For example, a user may secure the surface mountable base 200 of the light line generating assembly 10 to a work surface W (via any of the above described attachment mechanisms) such that the bottom surface 230 of the surface mountable base 200 is substantially parallel to the work surface W. The light generating unit 100 may then be coupled to the surface mountable base 200 and positioned to generate a pair of light lines LL1, LL2 on the work surface W. The light generating unit 100 may be rotated with respect to the surface mountable base 200 to selectively reorient the light lines LL1, LL2 as desired. The user may utilize the protractor 270 to measure the degree of rotation, marking the lines LL1, LL2 as desired. In this manner, a user can determine the number of degrees present between a first position and a second position of the laser lines LL1, LL2 and/or rotate the laser lines LL1, LL2 to predetermined angles (e.g., 45°, 90°, etc.). As a result, the user may align or indicate two planes or axes along a shared pivot point. In addition, the pivot point, by design, may always be coincident with the center point of the central channel 240 and coincident with the centers of the hole 320 and the conical recess 350 (when the disk 300 is rotated into the appropriate position).

While the present invention has been described in detail and with reference to specific embodiments thereof, it will be apparent to one skilled in the art that various changes and modifications can be made therein without departing from the spirit and scope thereof. For example, the housing 10 of the light generating unit 100 may possess any suitable dimensions, and may be any shape suitable for its described purpose (i.e., it may include shapes other than the generally C-shaped structure, including, but not limited to, geometric shapes such as circles, squares, etc). By way of specific example, the housing 110 of the light generating unit 100 may extend across the mountable base 200 (i.e., the opening 125 and the central aperture 135 may be omitted), with windows 140 disposed about the exterior surface of the housing 110 to permit light lines to extend beyond the shell's perimeter and onto the work surface W. In still another embodiment, the bottom surface 130 of the light generating unit 100 may extend across the lower end of the central aperture 135, creating a central aperture having an open top end and a closed bottom end.

Similarly, the mountable base 200 may possess any suitable dimensions and be any shape suitable for its described purpose. That is, the base 200 may possess shapes other than the generally Y-shaped structure, including, but not limited to, geometric shapes such as circles, squares, etc. In addition, the open channel 240 may be a closed channel, with the inner flange 155 extending completely around the channel 240. In another embodiment, the channel 240 may be omitted and/or the outer flange 150 may extend completely around the exterior surface of the light generating unit 100.

In addition, instead of being separable components, the light generating unit 100 may be fixed to the mountable base 200 such that the light generating unit 100 is capable of rotating with respect to the mountable base 200. In other words, the assembly 10 may have a unitary structure with the light generating unit 100 permanently attached to the mountable base 200. Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

We claim:

1. A light line generating assembly comprising:
a light generating unit including:
a first light assembly operable to generate a first light line in a first direction, and
a second light assembly operable to generate a second light line in a second direction, wherein at least one of the first light assembly and the second light assembly comprises a laser assembly including a laser diode, a collimating lens, and a line lens, and
wherein the first light line intersects the second light line at an intersection point; and
a base configured to receive the light generating unit and contact a supporting surface,
wherein the light generating unit is repositionable on the base from a first position to a second position to simultaneously reorient the first and second light lines along the supporting surface and to selectively move the light generating unit about the intersection point while received on the base.

2. The light line generating assembly of claim 1, wherein the light generating unit is removably received on the base.

3. The light line generating assembly of claim 1 further comprising at least one level indicator.

4. The light line generating assembly of claim 3, wherein the at least one level indicator is oriented at an oblique angle with respect to at least one of the first light line and the second light line.

5. The light line generating assembly of claim 3, wherein the at least one level indicator comprises a first bubble level indicator, a second bubble level indicator, and a third bubble level indicator angularly spaced about the light generating unit.

6. The light line generating assembly of claim 5, wherein the orientation of at least one of the first bubble level indicator and the third bubble level indicator is offset with respect to the orientation of the second bubble level indicator.

7. The light line generating assembly of claim 1, wherein the light generating unit comprises a housing including:
   a curved body having a first end and a second end defining an opening therebetween;
   a central axis; and
   a channel disposed along the central axis.

8. The light line generating assembly of claim 7, wherein the first light line and the second light line intersect at a point within the channel.

9. The light line generating assembly of claim 1, wherein the base further includes a ruled member attached thereto.

10. The light line generating assembly of claim 9, wherein the ruled member comprises a protractor configured to rotate with respect to the base.

11. The light line generating assembly of claim 1, wherein the base comprises a reconfigurable attachment mechanism operable to provide multiple modes of attachment of the base to the supporting surface.

12. A base for a light line generator comprising:
   a body configured to mount on a supporting surface, the body including:
      a top surface operable to removably receive a light line generating device, and
      a bottom surface operable to engage the supporting surface; and
   an attachment mechanism operable to move from a first attachment position, in which a first coupling device is operable to secure the body to the supporting surface, to a second attachment position, in which a second coupling device is operable to secure the body to the supporting surface.

13. The base of claim 12, wherein the attachment mechanism is further operable to move from the second attachment position to a third attachment position, in which a third coupling device is operable to secure the body to the supporting surface.

14. The base of claim 12, wherein the attachment mechanism is selected from the group consisting of a recess operable to receive double-sided adhesive tape, a hole operable to receive a nail or pin, and an aperture operable to receive a fastener.

15. The base of claim 12, wherein the attachment mechanism comprises a disk operable to move with respect to the body.

16. The base of claim 12, wherein the bottom surface of the body further comprises a foot member compressible from an extended position to a retracted position with respect to the body.

17. The base of claim 12 further comprising a ruled member coupled to the body.

18. The base of claim 17, wherein the ruled member comprises a protractor operable to move with respect to the body.

19. A light line generating assembly comprising:
   a light generating unit including a first light assembly operable to generate a first light line in a first direction, and a second light assembly operable to generate a second light line in a second direction;
   a level indicator disposed at an oblique angle with respect to each of the first and second light lines generated by the first and second light assemblies; and
   a base adapted to receive the light generating unit and be connected to a supporting surface.

20. The light line generating assembly of claim 19 wherein the light generating unit is repositionably received on the base such that the light generating unit is capable of moving from a first unit position on the base to a second position on the base to reposition the first and second light lines on the supporting surface.

21. The light line generating assembly of claim 19, wherein the light generating unit is removably received on the base.

22. A light line generating assembly comprising:
   a light generating unit including:
      a first light assembly operable to generate a first light line in a first direction, and
      a second light assembly operable to generate a second light line in a second direction; and
   a base configured to repositionably receive the light generating unit and contact a supporting surface, wherein the base includes a ruled member coupled thereto,
   wherein the light generating unit is repositionable on the base from a first base position to a second base position to reorient the first and second light lines on the supporting surface.

23. A base for a light line generator comprising:
   a body configured to mount on a supporting surface, the body including:
      a top surface operable to receive a light line generating device, and
      a bottom surface operable to engage the supporting surface, the bottom surface comprising a foot member configured to compress from an extended position to a retracted position with respect to the body; and
   an attachment mechanism configured to move from a first attachment position, in which a first coupling device secures the body to the supporting surface, to a second attachment position, in which a second coupling device secures the body to the supporting surface.

24. A light line generating assembly comprising:
   a light generating unit including:
      a housing comprising a curved body having a first end and a second end defining an opening therebetween, a central axis, and a channel disposed along the central axis;
      a first light assembly disposed within the housing, the first light assembly being operable to generate a first light line in a first direction, and
      a second light assembly disposed within the housing, the second light assembly being operable to generate a second light line in a second direction,
      wherein at least one of the first light assembly and the second light assembly comprises a laser assembly including a laser diode, a collimating lens, and a line lens; and
   a base configured to receive the light generating unit and contact a supporting surface, wherein the light generating unit is repositionable on the base from a first position to a second position to reorient the first and second light lines along the supporting surface.

* * * * *